United States Patent [19]
Moyal et al.

[11] Patent Number: 5,809,109
[45] Date of Patent: Sep. 15, 1998

[54] INTEGRATED RING SENSOR WITH FAULT DETECTION

[75] Inventors: Michael Moyal; Walter S. Schopfer, both of Austin, Tex.

[73] Assignee: Advanced Micro Devices, Inc., Sunnyvale, Calif.

[21] Appl. No.: 457,668

[22] Filed: Jun. 1, 1995

[51] Int. Cl.$^6$ .................................................. H04M 1/24
[52] U.S. Cl. ............................ 379/22; 379/26; 379/412; 379/34; 379/377
[58] Field of Search ................................ 379/1, 34, 399, 379/412, 402, 410, 411, 22, 2, 23, 24, 26, 27, 413, 416, 377; 370/222, 223, 224

[56] References Cited

U.S. PATENT DOCUMENTS

| | | | |
|---|---|---|---|
| 3,996,426 | 12/1976 | Lancaster | 179/84 A |
| 4,079,210 | 3/1978 | Sanderson | 179/18 HB |
| 5,038,375 | 8/1991 | Sinberg | 379/398 |
| 5,047,724 | 9/1991 | Boksiner et al. | 379/26 |
| 5,222,119 | 6/1993 | Asano | 379/26 |
| 5,233,649 | 8/1993 | Guerra et al. | 379/372 |
| 5,309,499 | 5/1994 | Webber | 379/29 |
| 5,311,587 | 5/1994 | Ohta et al. | 379/377 |
| 5,337,354 | 8/1994 | Gadsby | 379/377 |
| 5,390,231 | 2/1995 | Hung et al. | 379/2 |
| 5,436,953 | 7/1995 | Wilson | 379/24 |
| 5,511,118 | 4/1996 | Gores et al. | 379/399 |
| 5,515,417 | 5/1996 | Cotreau | 379/32 |
| 5,535,272 | 7/1996 | Sugiyama et al. | 379/377 |
| 5,539,805 | 7/1996 | Bushue et al. | 379/361 |
| 5,594,788 | 1/1997 | Lin et al. | 379/167 |
| 5,604,785 | 2/1997 | Pryor et al. | 379/2 |
| 5,617,466 | 4/1997 | Walance | 379/28 |
| 5,619,567 | 4/1997 | Apfel | 379/413 |
| 5,636,262 | 6/1997 | Mellan | 379/1 |
| 5,636,273 | 6/1997 | Schopfer et al. | 379/412 |
| 5,638,440 | 6/1997 | Nix et al. | 379/412 |
| 5,640,451 | 6/1997 | Schopfer et al. | 379/412 |
| 5,659,608 | 8/1997 | Stiefel | 379/377 |
| 5,659,610 | 8/1997 | Schorr et al. | 379/412 |
| 5,661,794 | 8/1997 | Rosch et al. | 379/399 |
| 5,666,406 | 9/1997 | Sutherland et al. | 379/399 |
| 5,668,866 | 9/1997 | Eriksson | 379/412 |
| 5,694,465 | 12/1997 | Apfel | 379/377 |
| 5,721,773 | 2/1998 | Debalko | 379/412 |

Primary Examiner—Curtis A. Kuntz
Assistant Examiner—Rexford N. Barnie
Attorney, Agent, or Firm—Foley & Lardner

[57] ABSTRACT

A power cross circuit detects a ring trip condition in order to switch a pair of switch relays to a protection circuit and to appropriate line driver circuitry to enable a talking condition for a telephone. The power cross circuit detects a rise in a DC current across a feed resistor connected to a ring bus and a ring line. The power cross circuit determines a difference in current passing across a first and second sense amplifier connected to respective ends of the feed resistor. The current difference is then converted to a voltage difference, and utilized by the power cross circuit to output a power cross condition when the current difference exceeds a predetermined value.

13 Claims, 6 Drawing Sheets

INTEGRATED RING SENSOR WITH FAULT DETECTION

BACKGROUND OF THE INVENTION

1. Field of the Invention

The present invention relates to an integrated ring sensor which senses a ringing signal and provides a signal indicating that a telephone is off-hook for both a short-loop condition and a power-cross condition.

2. Background of the Related Art

A terminal connected to a telephone line should undergo a "power-cross" test. This test is performed in order to detect the presence of a foreign potential, such as a high voltage of up to 1000 volts AC from a local power company which may become crossed with the telephone line in an environment outside of the telephone plant. FIG. 1 shows a telephone 10 connected to a telephone plant 12 through wires 14. A power line 16 poses a threat to the telephone plant 12 and any personnel operating the equipment. The power-cross test includes forcing a 1 ampere current into tip and ring lines 18, 20 regardless of the state (i.e., talking, standby or ringing) of the line, and checking whether the plant 12 survives the test. Generally, in order to provide a 1 ampere current, a 1,000 volt, 60 hertz signal through a 1 kohm resistor is applied to the tip and ring lines 18, 20. Other combinations of voltages and resistance values, such as a 600 volt signal through a 600 ohm resistor, or a 50 volt signal through a 50 ohm resistor, could also be used to obtain the 1 ampere current.

As mentioned above, the power-cross test is applied regardless of the state of the plant 12. For example, a person could be talking on the telephone 10, or the telephone 10 could be in a standby mode, or the telephone 10 could be ringing and on-hook. In conventional techniques, during either the talking mode or the standby mode, as shown in FIGS. 1 and 2, a protection device 22, such as a diode or a neon lamp, is connected to ring and tip lines 18, 20. When a high voltage such as the 118 volt AC power signal crosses wires 14 (FIG. 1), the current goes through the protection device 22, thereby preventing damage to the telephone plant 12 or telephone 10.

As shown in FIG. 3, during the ringing mode, the telephone 10 is connected to ground via the tip line 18, and the ring line 20 is connected to a ringer voltage RV in order to perform the telephone ringing operation. In this situation, the protection device 22 is disconnected. Thus, although protection is provided in the talking and standby modes, there is no protection provided if a power-cross condition occurs in the ringing mode.

Also, when the telephone 10 goes from an on-hook state to an off-hook state while it is ringing (i.e., when the telephone user picks up the handset), there is a need to quickly switch relays S1A, S1B connecting the ring and tip lines 18, 20 to a ringing bus (not shown in FIG. 3). This switching needs to be done in order that any resistive elements on the ring and tip lines 18, 20 not become damaged due to the high ringing voltage.

SUMMARY OF THE INVENTION

The present invention provides a circuit for quickly detecting a ringing condition when a telephone is off hook, in order to protect the telephone and the telephone plant by providing a signal used to quickly switch ring relays and to allow for connection to a protection device, if necessary.

Accordingly, the present invention relates to an apparatus that includes a circuit for detecting the presence of a ringing current through a ring feed resistor connected to a ring bus and a ring line. The apparatus also includes a first and second resistor connected to respective ends of the ring feed resistor, wherein a first and second current flows through the respective first and second resistors. The apparatus further includes a current difference circuit, which receives the first and second currents, subtracts the first current from the second current, and outputs a difference current as a result of the subtraction. The apparatus still further includes a current-to-voltage converter, which converts the difference current to a difference voltage. A power-cross circuit connected to the current-to-voltage converter detects a power-cross condition when the difference voltage is above a predetermined value. For short loops, the power-cross condition also indicates when the telephone has changed from an on-hook ringing state to an off-hook ringing state.

BRIEF DESCRIPTION OF THE DRAWINGS

For a description of a method and apparatus according to the invention, reference is made to the following description and accompanying drawings, in which.

DETAILED DESCRIPTION OF THE PREFERRED EMBODIMENTS

Figure 1:
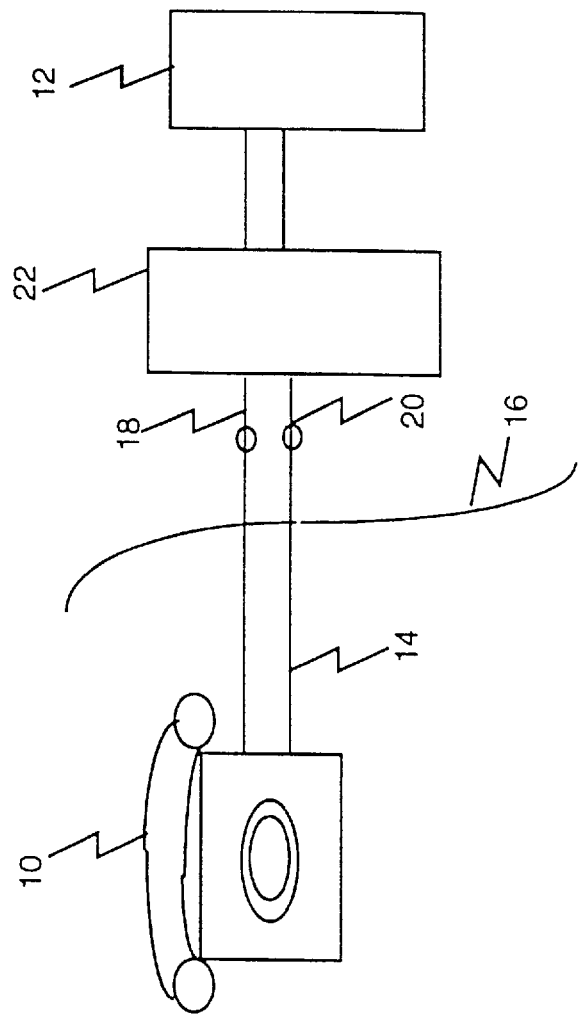
FIG. 1 is a schematic circuit diagram of a typical power-cross test detection circuit.
Figure 2:
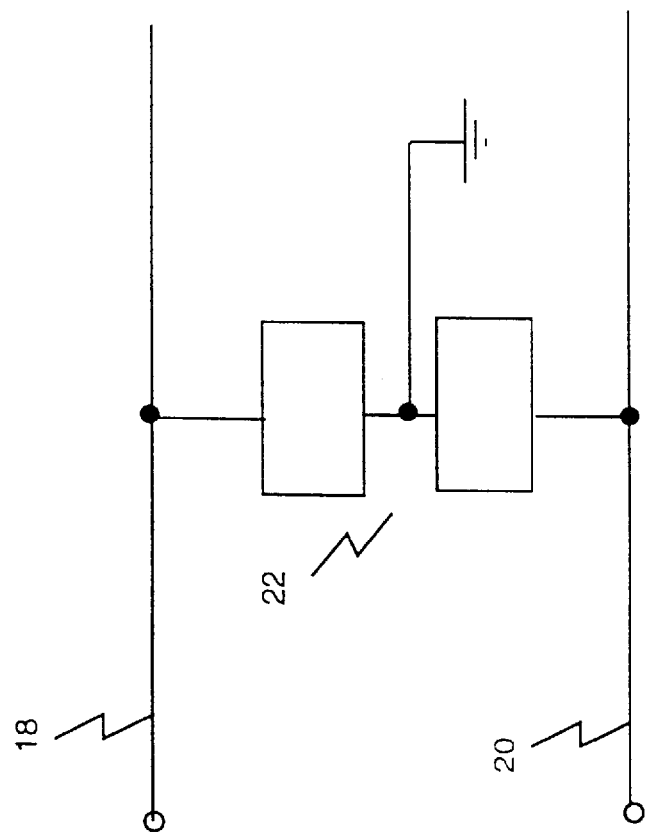
FIG. 2 illustrates the protection device configuration according to the circuit shown in FIG. 1.
Figure 3:
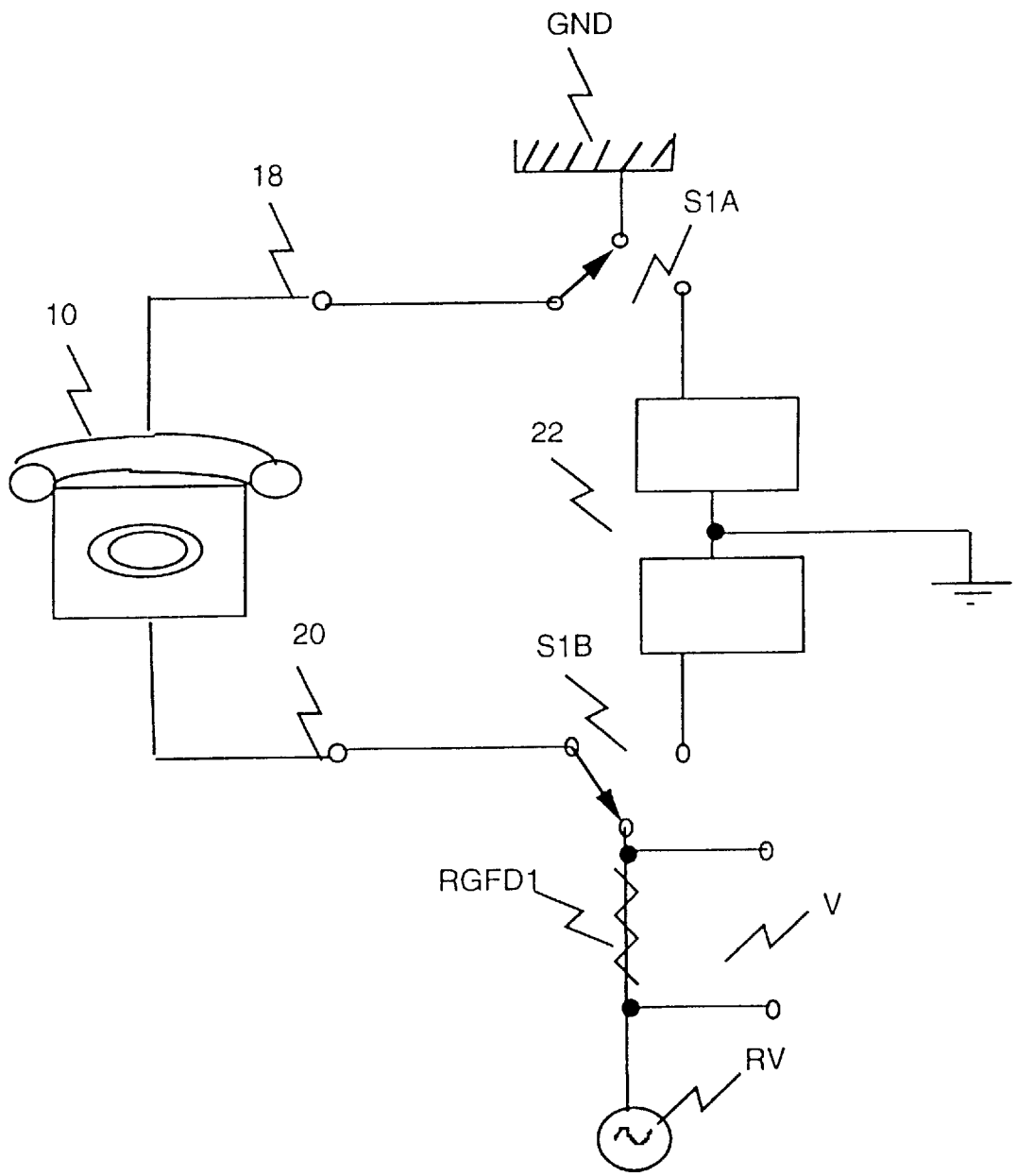
FIG. 3 shows a schematic circuit diagram illustrating the ringing state of the circuit shown in FIG. 1.
Figure 4:
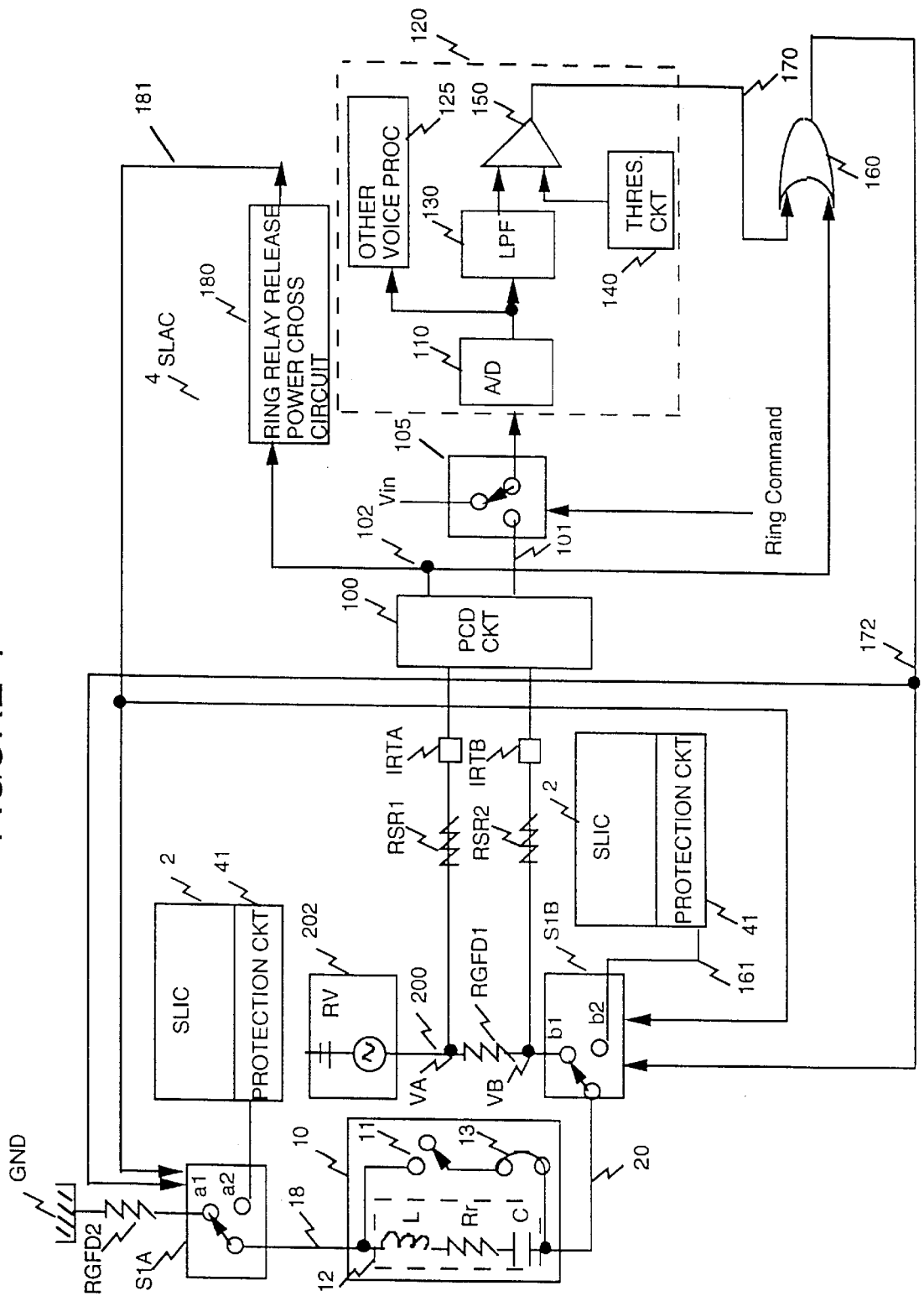
FIG. 4 is a block diagram of the integrated ring sensor according to the invention being connected to other telephone line devices.

Referring now to the drawings, FIG. 4 shows a telephone 10 connected to a Subscriber Line Interface Circuit (SLIC) 2 via a ring line 20 and a tip line 18, and a pair of relays S1A and S1B. The SLIC 2 can be implemented as separate circuits or in a single SLIC device. Also shown in FIG. 4 is a portion of a Subscriber Line Audio Processing Circuit (SLAC) 4, a first ring feed resistor RGFD1 connected between a ring bus 200 and the relay S1B, and a second ring feed resistor RGFD2 connected between the relay S1A and a reference (e.g., ground) potential GND. A pair of sense resistors RSR1 and RSR2 are connected to respective ends of the first ring feed resistor RGFD1. The sense resistors RSR1 and RSR2 are also respectively connected to the SLAC 4. The SLAC 4 receives a first current I1 from the sense resistor RSR1 and a second current I2 from the sense resistor RSR2, and outputs a current difference I1–I2.

The current difference I1–I2 is received by an A/D Converter 110, which converts the analog current difference I1–I2 into a digital number. The A/D Converter 110 is part of a Digital Signal Processor (DSP) 120, which includes a low pass filter (LPF) 130 for removing a 20 Hz AC component from the DC component of the ringing signal. When the DSP 120 determines that the DC component is above a certain threshold value, a ring trip detection is indicated.

The voltage drop ($V_A - V_B$) across the first ring feed resistor RGFD1 is proportional to the current flowing in the telephone loop. The voltages $V_A$, $V_B$ on either side of the first ring feed resistor RGFD1 are sensed by a pair of sense resistors RSR1, RSR2 that are connected to the Power Cross Detection (PCD) circuit 100 in the SLAC 4 via terminals IRTA and IRTB, respectively. As a result, the voltage out of the PCD circuit 100 on line 101 is proportional to a ringing current flowing in the telephone loop when ring relays S1A and S1B are in the ringing position a1, b1. This voltage on line 101 is used by the SLAC 4 for performing the ring trip and ring relay release functions at proper instants in time, as discussed further herein.

In the ringing state, switch 105 routes the output of the PCD circuit 100 on line 101 to the input of the A/D converter 110. The position of switch 105 is controlled by an external ring command supplied by higher level firmware or software, for example, from a private branch exchange, central office, or other similar entity. This command can be supplied as one of several commands on a control channel input to the SLAC 4.

In the non-ringing state, switch 105 routes a voice input Vin to the input of the A/D converter 110, which in turn routes its output to other voice processing circuitry, as shown in box 125. During the ringing state, the A/D converter 110 samples the output of the PCD circuit 100 at a specified rate, which in one embodiment according to the invention, for example, is set to 4 MHz. The A/D converter 110 also can be configured to perform a decimation function and to output an n-bit word at a rate $f_d$ less than 4 MHz, such as 8 kHz, with this output received by the low pass filter (LPF) 130 of the DSP 120. The sampling rate of the LPF 130 is set, for example, to 500 Hz (i.e., 2 millisecond sampling period) in a preferred embodiment. The LPF 130 removes much of the AC ringing related ripple so that a reliable ring trip referenced at a DC threshold set by ring trip threshold circuit 140 can be detected by a DC threshold comparator 150 internal to the DSP 120. It will be known to those of ordinary skill in the art that the processing functions including those of LPF 130 and ring trip threshold detection circuit 140 can be implemented in microcode.

The ring trip threshold voltage from circuit 140 is set to cause a trigger when the DC voltage across first ring feed resistor RGFD1 is equal to about 50 volts. In the preferred embodiment, the first ring feed resistor RGFD1 has an impedance of approximately 510 ohms, which is equivalent to the SLAC 4 detecting a loop current of at least 98 milliamperes.

During the ringing state, the relay switch S1A is in position a1 and connected to one end of the second ring feed resistor RGFD2. The other end of the second ring feed resistor RGFD2 is connected to the reference potential GND. Also, during the ringing state, switch S1B is in position b1 and connected to one end of the first ring feed resistor RGFD1. The other end of the first ring feed resistor RGFD1 is connected to a ring bus 200. The ring bus 200 includes a ring generator 202 operating at a 20 Hz frequency. The ringer voltage RV output by the ring generator 202 typically is about 100 volts RMS. During the ringing state, the ring generator 202 on the ring bus 200 is connected to the ring and tip lines 18, 20 via the switches S1A, S1B, as discussed above. This connection causes current to flow through the first ring feed resistor RGFD1 and through the internal ringing impedance of the telephone 10 defined by capacitance C, ringing inductance L and resistance $R_r$.

When the telephone 10 rings while on-hook, the current flowing through the telephone 10 is almost entirely AC current. Very little DC current flows through the telephone 10, since the telephone 10 has an internal capacitance C and ringing inductance L connected in series with the ring and tip line connections when it is on-hook. Any DC current passing through the telephone 10 is collected by the capacitance C, the ringing inductance L and the resistance $R_r$. Therefore, the current drawn through its internal "ringing" impedance in the telephone 10 causes current to flow through the first ring feed resistor RGFD1.

When the telephone 10 is picked up and goes off-hook during its ringing state, the capacitance C, ringing inductance L and resistance $R_r$ are shorted out by a switch 11 internal to the telephone 10 which detects the off-hook state, and the handset 13 of the telephone 10 is then connected across the ring and tip lines 18, 20 by the position change of the switch 11. The telephone handset 13 has a low impedance of about 100 ohms. In order to reduce the possibility of damage, it is important that pickup of the telephone 10 be quickly detected (i.e., detection of the on-hook to off-hook condition), since the amount of DC current flowing through the first ring feed resistor RGFD1 will have significantly increased as a result of the reduced impedance.

At this time, if the ring relays S1B and S1A are not switched away from the first and second ring feed resistors RGFD1, RGFD2, respectively, these ring feed resistors could become damaged. Damage can result from the ring feed resistors RGFD1, RGFD2 being connected through the low telephone impedance across the high voltage source RV of the ring generator 202 on the ring bus 200. The PCD circuit 100 in the SLAC 4 needs to rapidly detect this change from an on-hook condition to an off-hook condition during ringing. Typically, this change should be detected within 200 milliseconds. According to the invention, the PCD circuit 100 and DSP 120 in SLAC 4 are used together for ring trip detection and to switch the ring relays S1A, S1B out of the ringing position (a1, b1) and into a talking position (a2, b2). When ring relays S1A and S1B are in the talking position (a2, b2), the first and second ring feed resistors RGFD1, RGFD2 are not be shorted out by the high voltage RV of the ring generator 202 on the ring bus 200.

The integrated ring sensor according to the invention formed by the portion of the SLAC 4 shown in FIG. 4 senses the DC current indicating an off-hook condition and the ringing current indicating an on-hook condition, as discussed above. Using this information, the integrated ring sensor sorts out the times when the relays S1A and S1B are to be switched over from connection to the ring feed resistors RGFD1, RGFD2 as shown in position a1, b1, to connection to a protection circuit 41 internal to the SLIC 2, as shown in position a2, b2. Such switching of relays S1A and S1B is activated by corresponding control signals on signal lines 172 and 181.

The OR Gate 160 functions to output the control signal on line 172. One input to the OR Gate 160 is the output from the DSP 120 on signal line 170 to cause ring relays S1A and S1B to switch to the position a2, b2 in order to connect the ring and tip lines 18, 20 to the protection circuits 41 when a telephone 10 in a long loop condition is taken off hook in the ringing state. The SLIC circuit 2 has a connection through line 161 to the ring line 20. The PCD circuit 100 has a connection through line 102 to both the ring relay release power cross circuit 180 and the OR Gate 160. The OR Gate 160 receives a long loop ring detection on line 170 and a short loop ring detection on line 102. The short loop ring detection on line 102 is required since the A/D 110 becomes overloaded during a short loop condition, thereby necessitating the output on line 102 to cause a ring trip. The OR Gate 160 switches the ring relays S1A, S1B to the protection position (a2, b2) when the telephone is off hook in the absence of ringing. The talking position (a2, b2) also corresponds to the talking position.

The short-loop ringing condition occurs when a telephone of a subscriber close to the main telephone exchange rings, and a relatively high voltage is seen at the main telephone exchange due to this ringing. For these close-in telephones, the total loop resistance is about 700 ohms or less. A long loop exists for telephones that are farther away from the central office or exchange, with total loop resistances of more than 700 ohms.

FIG. 4 also shows a pair of sense resistors RSR1, RSR2. In the first embodiment according to the invention, the sense resistors RSR1, RSR2 are both equal to about 750 kohm, but they may be set to any large impedance value, while remaining within the scope of the invention. When there is little or no current flowing through the first ring feed resistor RGFD1, the current flowing through both of the sense resistors RSR1, RSR2 will essentially be equal. Each of the sense resistors RSR1, RSR2 is connected to the PCD circuit 100 through respective SLAC input ports IRTA, IRTB.

Figure 5:
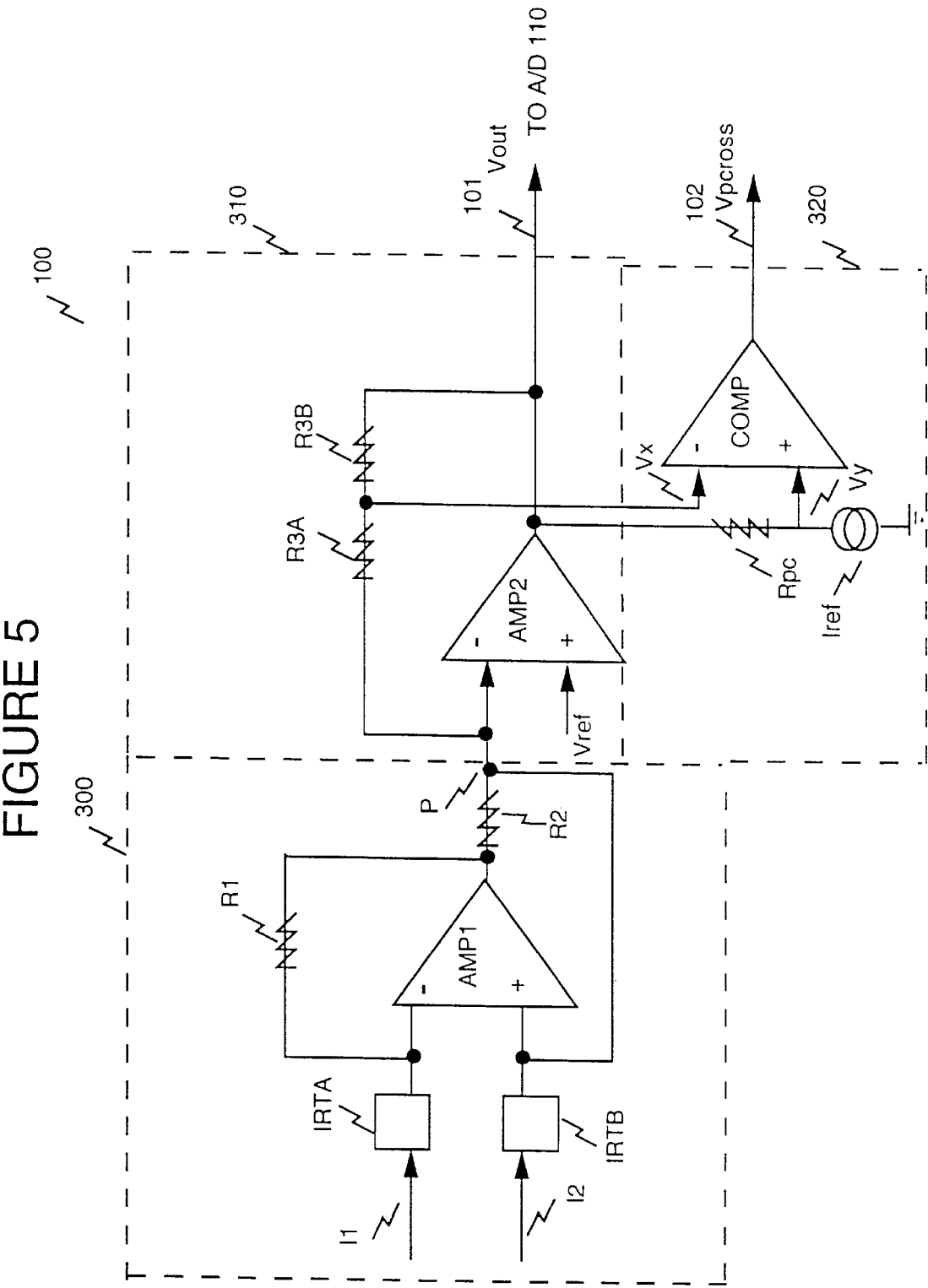
FIG. 5 shows a detailed description of the Power Cross Detection (PCD) circuit according to a first embodiment of the invention.

FIG. 5 shows the PCD circuit 100 according to a first embodiment of the invention. Referring now to both FIG. 4 and FIG. 5, the PCD circuit 100 according to the first embodiment of the invention includes a current differencing ($I_1$-$I_2$) circuit 300, a current-to-voltage converter (I-V) circuit 310, and a power-cross circuit 320. The current differencing circuit 300 receives a current $I_1$ flowing through the first sense resistor RSR1, a current $I_2$ flowing through the second sense resistor RSR2, and outputs a difference current equal to $I_1$-$I_2$ as a result thereof.

As previously discussed with respect to FIG. 4, when the telephone 10 rings, a large amount of AC current flows through the first ring feed resistor RGFD1, but little or no net DC current flows through the first ring feed resistor RGFD1. Thus, the output current of the current differencing circuit 300 in this case is approximately zero.

When the telephone 10 is taken off-hook while in the ringing state, the DC current increases while the AC current remains flowing through the first ring feed resistor RGFD1. The increased DC current is due to the internal impedance of the telephone 10 drawing current as the internal ringer impedance formed by internal telephone circuit 12 is shorted out by the switch 11. This increased current results in the voltage $V_A$ at one end of the first ring feed resistor RGFD1 being different from the voltage $V_B$ at the other end of the first ring feed resistor RGFD1. As a result, current flows in sense resistors RSR1 and RSR2. In this case, the current differencing circuit 300 shown in FIG. 5 outputs a current difference value $I_1$-$I_2$ which is greater than zero amps.

The current differencing circuit 300 is connected to a current-to-voltage converter circuit 310, in which the difference current $I_1$-$I_2$ is converted to a voltage proportional to $I_1$-$I_2$; i.e., $V_{out}$=k*($I_1$-$I_2$), where k is a constant corresponding to the feedback resistance of (R3A+R3B) ohms. The current-to-voltage converter circuit 310 is connected on line 101 through switch 105 in FIG. 4 to the A/D converter 110. The A/D converter 110 converts the analog voltage $V_{out}$ into an n-bit digital signal.

The A/D converter 110 outputs the n-bit digital signal to the Digital Signal Processor (DSP) 120, which includes the low pass filter 130, the ring trip threshold voltage circuit 140, and the comparator 150. The low pass filter 130 receives the n-bit digital signal and filters its AC components, such as ringing-related ripple. The filtered output of the low pass filter 130 can be compared to the ring trip threshold voltage output from the ring trip threshold voltage circuit 140 to reliably determine whether a ring trip has occurred and thereby generate the proper state on signal line 170.

In the system according to the invention, the low pass filter 130 is implemented in hardware or software with a pair of complex poles that provides the high level of filtering required for reliable ring detection. The low pass filter 130 can be described by the following transfer function:

$$H(z)=H_2(z)*a_0/(1a_1*z^{-1}+a_2*z^{-2}),$$

where $a_0$=0.00390625, $a_1$=−1.9375, $a_2$=0.941406, and the sampling rate=500 Hz. Further, $$H_2(z) = \sum_{k=0}^{15} z^{-k}$$

The low pass filter 130 has a 4 Hz cutoff frequency in order to eliminate the ringing related AC signal from being input to the comparator 150. Other cutoff frequency ranges and transfer functions can be utilized by the low pass filter 130 and still keep within the scope of the invention.

The output 170 of the comparator 150 is a primarily-DC signal, which indicates whether a ring trip has occurred. This ring trip occurrence is determined from the logical state of the output of the comparator 150, for example, when a logic "1" is output by the comparator 150. Alternatively, ring trip detection could be determined by a logic "0" output from the comparator 150 using different components (such as an inverter after the comparator 150), as is known to one of ordinary skill in the art.

As previously mentioned, FIG. 5 is a more detailed diagram of the current differencing circuit 300, the current-to-voltage converter circuit 310 and the power-cross circuit 320 comprising the PCD circuit 100 of the first embodiment. The current differencing circuit 300 is shown as including a negative feedback amplifier AMP1, which receives the current $I_1$ flowing through the first sense resistor RSR1 at its inverting terminal, and which receives the current $I_2$ flowing through the second sense resistor RSR2 on its noninverting terminal. A resistor R1 is connected between the output of the amplifier AMP1 and the inverting terminal, and a resistor R2 is connected between the output of the amplifier AMP1 and the inverting terminal of amplifier AMP2. The current into the summing node P corresponds to the difference between currents $I_1$ and $I_2$. This "difference current" is fed directly to the current-to-voltage converter circuit 310.

The current-to-voltage converter circuit 310 includes a feedback amplifier AMP2, with two resistors R3A, R3B connected in series. In the first embodiment, each resistor R3A, R3B has a resistance value equal to 7.5 kohms. Resistors R3A, R3B are connected in series between the output port of the amplifier AMP2 and the inverting terminal of the amplifier AMP2. A reference voltage $V_{ref}$ is connected to the noninverting terminal of the amplifier AMP2. In the system according to the invention, $V_{ref}$ is set to 2.2 volts, which is a voltage value about halfway between the reference potential (i.e., ground) and a logic "one" potential (i.e., 5 volts). Of course, $V_{ref}$ can be set to any reference voltage between the maximum and minimum allowable voltage and still keep within the scope of the invention.

The output of the amplifier AMP2 is a voltage equal to ($I_1$-$I_2$)*R3A volts (where R3A is the resistance value of resistor R3A). Other configurations of current differencing circuits and current to voltage converters can also be used and still keep within the scope of the invention. Similarly, other values of R3A, R3B can be utilized and still keep within the scope of the invention, as long as R3A and R3B have essentially equivalent resistance values.

The power-cross circuit 320 is connected to the current-to-voltage converter circuit 310. Also, the inverting terminal of a comparator COMP of the power-cross circuit 320 is connected to a point between the series connection of the resistors R3A, R3B of the current-to-voltage converter circuit 310. The noninverting terminal of the comparator COMP is connected to a reference current $I_{ref}$, and to a power-cross resistor Rpc. The comparator COMP compares the voltage across the resistor R3A to a reference voltage equal to $I_{ref}$* Rpc, and outputs a logical condition. For example, the comparator COMP outputs a logic "one" when $(I_1-I_2)$ * R3A>$I_{ref}$*Rpc (i.e., $V_x<V_y$) This logic "one" condition indicates that the voltage across the first ring feed resistor RGFD1 has exceeded a particular voltage level, for example, 50 volts. Of course, inverse logic can also be used to obtain similar results.

A ring trip is detected at the instant the voltage across the resistor R3A exceeds the reference voltage $V_y$. The power-cross circuit 320 is configured so that the power-cross resistor Rpc can be arranged for any ring trip value, and is independent of the changes in voltage and current levels at the inverting node of the comparator COMP. Also, the resistor R3A is essentially shared by both the current-to-voltage converter circuit 310 and the power-cross circuit 320, thereby resulting in a savings of the circuit area required for the PCD circuit 100.

The output of the comparator COMP is the power-cross signal $V_{pcross}$ as shown on signal line 102. Referring now to FIG. 4, the power-cross signal $V_{pcross}$ is then input to a ring relay release power cross circuit 180, which determines if a power cross condition has occurred. For example, in ring relay release power cross circuit 180, a line frequency is computed to determine whether the condition causing $V_{pcross}$ to be active is the result of a power-cross, high voltage condition due to a power line (typically about a 60 Hz frequency), or is a result of a short-loop ringing condition (typically about a 20 Hz frequency). If a power cross high voltage condition is determined to exist, ring relay release power cross circuit 180 causes a signal on line 181 to set relays S1A and S1B to the protect position a2, b2.

Figure 6:
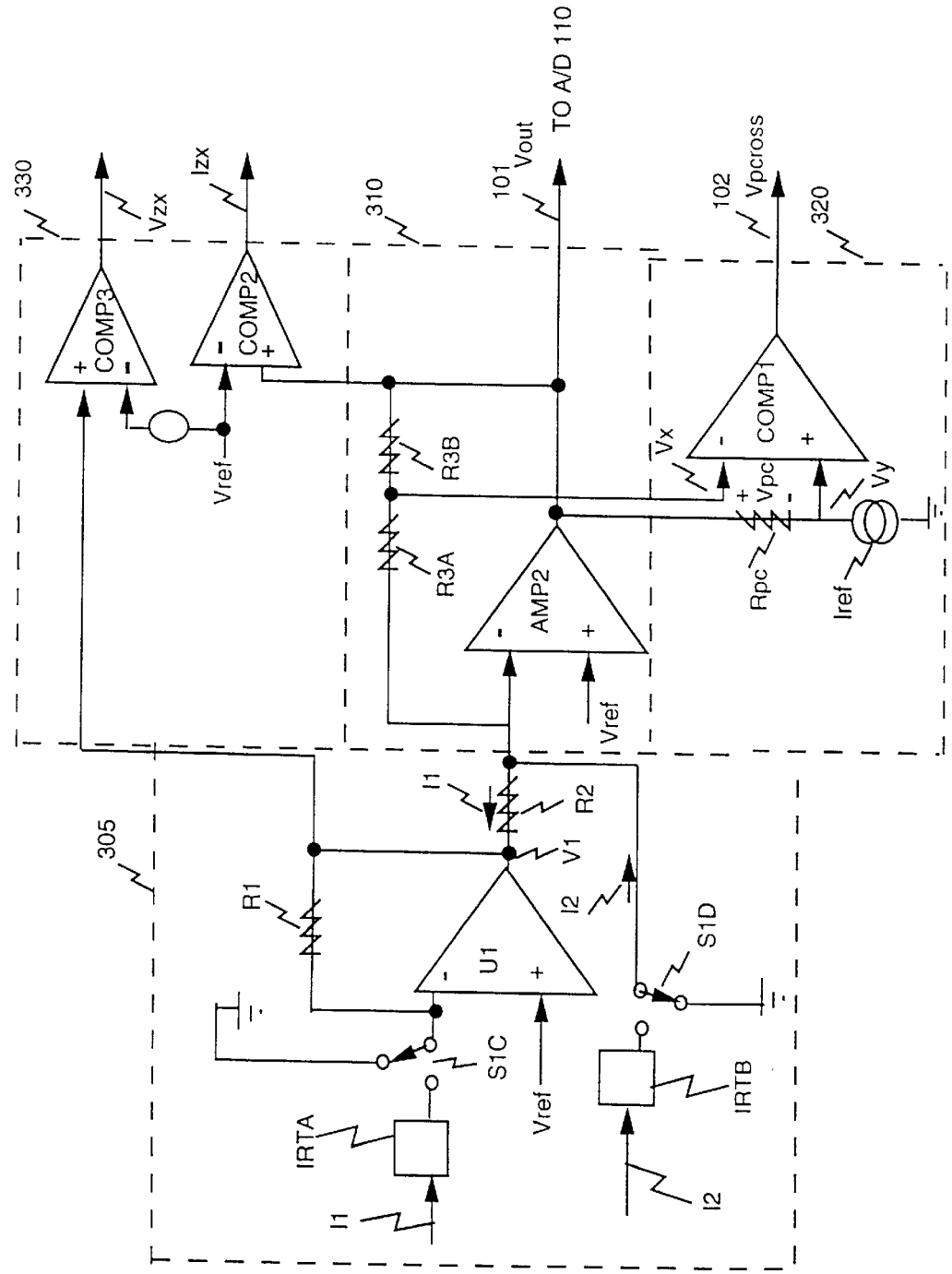
FIG. 6 shows a detailed description of the PCD circuit according to a second embodiment of the invention.

FIG. 6 shows a second embodiment of the PCD circuit 100 according to the invention, with the current differencing circuit 300 being replaced with another type of current differencing circuit 305. The remaining elements of the PCD circuit 100 are practically the same as those shown in FIG. 5 for the first embodiment of the PCD circuit 100. FIG. 6 also shows a zero crossing voltage and current detection circuit 330, which can also be utilized in the first embodiment and which will be described in more detail hereinbelow. In FIG. 6, the current $I_1$ that flows through the first sense resistor RSR1 is connected to the inverting input of the feedback amplifier U1 of the current differencing circuit 305. Because of the feedback provided by resistor R1, the inverting input of amplifier U1 is held at a reference voltage $V_{ref}$. Since the current $I_1$ cannot flow into the input of amplifier U1, it must flow through resistor R1, and thereby creates a negative shift $V_1$ at the output of amplifier U1. This voltage shift $V_1$ is proportional to the loop-to-ground voltage $V_A$ (see FIG. 4), as shown by the following equation:

$$V_1=-I_1*R1=-V_A*(R1/RSR1) \quad (1)$$

Referring back to FIG. 6, if R2=R1, then the current $I_1$ is duplicated in resistor R2. The current $I_1$ flows into the inverting input of amplifier AMP2. Also flowing into the inverting input of amplifier AMP2 is the current $I_2$ which flows in the opposite direction with respect to the current $I_1$. Therefore, the current that flows into amplifier AMP2 is:

$$I_1-I_2=-(V_A-V_B)/RSR1=-V_{RGFD1}/RSR1 \quad (2)$$

where $V_{RGFD1}$ is the voltage across the first ring feed resistor RGFD1. As can be seen from equation (2), the current differencing circuit 305 outputs the difference current $I_1-I_2$ to the current-to-voltage converter circuit 310.

The use of the current differencing circuit 305 of the second embodiment in lieu of the current differencing circuit 300 of the first embodiment leads to a slightly more stable system, since a stray capacitance across the input terminals of amplifier AMP1 of the current differencing circuit 300 may sometimes cause a high frequency oscillation on the output of amplifier AMP1. This high frequency oscillation on the output of amplifier AMPI is undesirable, and the current differencing circuit 305 of the second embodiment alleviates this potential problem.

Assuming RSR1=RSR2=RSR, then the output of amplifier AMP2 is:

$$V_{OUT}=V_{RGFD1}*(R3A+R3B)/RSR \quad (3)$$

As can be seen from equation (3), $V_{out}$ on line 101 is a voltage that is proportional to the ringing current flowing through the subscriber loop. This voltage is fed to the A/D converter 110 and the low pass filter 130 of the DSP 120, as can be seen from FIG. 4. The DSP 120 removes the AC components of the ringing current to provide for an accurate and reliable ring trip detection.

Referring back to FIG. 6, since $V_{out}$ is a heavily attenuated version of $V_{RGFD1}$, voltage offsets that build up in amplifiers U1, AMP2, and the A/D converter 110 can cause significant errors that may produce false ring trips, or may not allow for detection of an actual ring trip. To prevent this from happening, these errors are calibrated out during the first millisecond or so (about 4 frame cycles) after a ringing command is issued. During the calibration time which occurs immediately after the ringing command is issued, the inputs to amplifiers U1 and AMP2 are opened by internal switches S1C, S1D, and the output of the A/D converter 110 is stored in a register (not shown). The opening of switches S1C and S1D results in the input ports IRTA and IRTB being connected to ground. In a preferred embodiment, switches S1C and S1D are metal oxide semiconductor (MOS) switches.

When ringing is started, the register contents are subtracted from the output of the A/D converter 110, thereby removing any internal offset errors in the SLAC 4. Of course, the above error-removing procedure works equally as well for the PCD circuit 100 according to the first embodiment, with both of the inputs to amplifier AMP1 being opened by the switches S1C and S1D, to thereby remove any voltage offset that may have built up in amplifier AMP1.

The output $V_{pcross}$ of comparator COMP1 is set to a logic one when $V_{RGFD1}$ is greater than 50 volts. The inverting input of comparator COMP1 is connected to the junction between the resistors R3A, R3B. The voltage, $V_y$, at this junction, is:

$$V_y=V_{RGFD1}*R3A/RSR1 \quad (4)$$

The non-inverting input of comparator COMP1 is connected to $V_{out}$ through power cross resistor Rpc, thereby causing a voltage drop between $V_{out}$ and the voltage $V_y$ at the non-inverting input of comparator COMP1.

Therefore, at the transition point of comparator COMP1 (i.e., the input value at which the output value changes its logic state):

$$V_y = V_{out} - V_{rpc} \quad (5)$$

where $V_{rpc}$ is the voltage across resistor Rpc. Equation (5) can be rewritten as:

$$V_{RGFD1} * R3A/R3B)/RSR - V_{rpc} \quad (6)$$

Solving for $V_{RGFD1}$:

$$V_{RGFD1} = V_{rpc} * RSR * 2/R3A \quad (7)$$

The voltage Vrpc determines the value of $V_{RGFD1}$ at which the output of comparator COMP1 will transition from a logic "zero" to a logic "one". The value of $V_{rpc}$ is:

$$V_{rpc} = I_{ref} * R \quad (8)$$

Assuming $I_{ref}$=64 microamps and R4=7.81 kohms, then we get $V_{rpc}$=0.5 volts. Assuming RSR=750 kohms and R3A=R3B=7.5 kohms, then the value of $V_{RGFD1}$ at which the output of comparator COMP1 changes from a "zero" to a "one" is:

$$V_{RGFD1} = 0.5v * 750 \text{ kohms}/7.5 \text{ kohms} = 50 \text{ volts}$$

Preferably, comparator COMP1 has a hysteresis built into it, for example, a 10% hysteresis. Then, as $V_{RGFD1}$ decreases to voltages less than 50 volts, comparator COMP1 will transition from a logic "one" to a logic "zero" at approximately 45 volts.

As mentioned earlier, during the ringing state, the SLIC 2 and its associated surge protection circuit 41 are not connected to the ring and tip lines 18, 20, since the ring and tip lines 18, 20 are connected respectively to the ring bus 200 and reference potential GND through the ring feed resistors RGFD1, RGFD2. When the DC component of the difference between the current $I_1$ (flowing across the sense resistor RSR1) and the current $I_2$ (flowing across the sense resistor RSR2) gets large, the SLAC 4 detects this condition by its PCD circuit 100 of either the first or second embodiments of the invention, and sends appropriate signals on lines 101 and 102.

Current and voltage zero crossing detection circuit 330 is also shown in FIG. 6. Comparators COMP2 and COMP3 respectively determine loop current and loop voltage zero crossings.

The loop voltage zero crossing waveform $V_{zx}$ is a pulse train that is used to time the connection of the ring relays S1A, S1B to the protection circuits at times as close as possible to the time when the voltage across the contacts of relays S1A, S1B is zero. This reduces the current surge through the contacts of the ring relays S1A, S1B, thereby extending the life of these components.

The loop voltage zero cross waveform $V_{zx}$ is derived by comparing the voltage $V_1$ output from amplifier AMP1 to the voltage $V_{zxref}$. This comparison is done at comparator COMP3. The loop voltage zero crossings must be referenced to the battery voltage at the central office or exchange (not shown in FIG. 6), because any loop capacitance that is present before the ring relays S1A, S1B connect to the protection circuits is already charged to a voltage near the central office battery voltage. In the system according to the second embodiment of the invention, $V_{zxref}$ is set to 0.226 volts, and represents a 50 volt central office battery.

The current zero crossing pulses $I_{zx}$ are used to time the connection of the ring relays S1A, S1B to the feed resistors RGFD1, RGFD2 as close as possible to the time when the current through their contacts is zero. This will also extend the life of the relays S1A, S1B by reducing arcing across the contacts caused by loop inductance. The loop current zero crossing pulses are derived by comparing $V_{out}$, which is proportional to the loop current, to $V_{ref}$ by using comparator COMP2. Like comparator COMP1, comparators COMP2 and COMP3 preferably have a hysteresis (e.g., 10%) to make them more immune to noise that may appear on the loop. The current zero crossing $I_{zx}$ and the voltage zero crossings $V_{zx}$ are input to the ring relay release power cross circuit 180 to determine if a valid power cross has occurred.

The PCD circuit 100 according to both the first and second embodiments of the invention can thus be utilized for different types of telephones having different internal impedances. The condition of $I_1 - I_2$ being greater than a predetermined value is used to trip the ringing signal coming from the ring bus 200 and switch the relays S1A and S1B away from the ring bus 200 and to a SLIC 2 having a protection circuit 41. This switching is done in order to protect the telephone 10 and other components connected to the ring and tip lines 18, 20.

While preferred embodiments of the invention has been described herein, modification of the described embodiments may become apparent to those of ordinary skill in the art, following the teachings of the invention, without departing from the scope of the invention as set forth in the appended claims.

What is claimed is:

1. An apparatus for detecting the presence of an off-hook condition of a telephone connected to a ring line and a tip line when said telephone is in a ringing state and for connecting said telephone to a surge protection circuit when said telephone is in both said off-hook condition and in said ringing state, comprising:

a first relay switch having a first end connected to said ring line and a second end connected to one of a first feed resistor and said surge protection circuit;

a second relay switch having a first end connected to said tip line and a second end connected to one of a second feed resistor and said surge protection circuit;

said first feed resistor having a first end connected to a ring bus for receiving a ring signal and having a second end connected to said first relay switch;

said second feed resistor having a first end connected to a reference potential and having a second end connected to a second relay switch;

a first and second sense resistor respectively connected to said first and second ends of said first feed resistor;

a current differencing circuit having a pair of input ports respectively connected to said first and second sense resistors, said current differencing circuit detecting a current difference between a first current flowing across said first sense resistor and a second current flowing across said second sense resistor;

a current to voltage converter connected to said current differencing circuit, said current to voltage converter receiving said current difference and outputting a voltage difference as a result thereof; and a power cross circuit connected to said current to voltage converter circuit, said power cross circuit receiving said voltage difference and outputting a power cross condition when said voltage difference is greater than a predetermined voltage value.

2. An apparatus according to claim 1, wherein said current differencing circuit comprises:

an amplifier having an inverting port, a noninverting port, and an output port, said inverting port receiving said first current and said noninverting port receiving said second current;

a first resistor connected between said inverting port and said output port of said amplifier; and a second resistor connected between said output port of said amplifier and said current to voltage converter, wherein said output port of said amplifier outputs said current difference equal to said first current minus said second current.

3. An apparatus according to claim 2, wherein said current to voltage converter comprises:

a second amplifier having an inverting port, a noninverting port, and an output port, said inverting port receiving said current difference and said noninverting port being connected to a reference potential; and a third resistor and a fourth resistor connected between said inverting port and said output port of said second amplifier, said third resistor connected in series with said fourth resistor and each having a substantially equal resistance value, wherein said voltage difference at said output port of said second amplifier corresponds to a voltage equal to said current difference multiplied by said substantially equal resistance value.

4. An apparatus according to claim 3, wherein said power cross circuit comprises:

a third amplifier having an inverting port, a noninverting port, and an output port, said inverting port being connected to a junction point between said third and fourth resistors, said noninverting port being connected to a reference current; and a reference resistor having a first end connected to said noninverting input of said third amplifier and having a second end connected to said output of said second amplifier, wherein said power cross circuit outputs a logic one value at said output port of said second amplifier when said current difference multiplied by said substantially equal resistance value is greater than said reference current multiplied by a resistance of said reference resistor.

5. An apparatus according to claim 4, wherein said first and second relay switches are connected to said surge protection circuit when said power cross circuit outputs said logic one value, and said first and second relay switches are respectively connected to said first and second feed resistors otherwise.

6. An apparatus according to claim 4, wherein said first feed resistor has a resistance value equal to about 500 ohms.

7. An apparatus according to claim 4, wherein said first and second sense resistors each have a resistance value equal to about 750 kohms.

8. An apparatus for detecting the presence of an off-hook condition of a telephone connected to a ring line and a tip line when said telephone is in a ringing state and for connecting said telephone to a surge protection circuit when said telephone is in both said off-hook condition and in said ringing state, comprising:

a first relay switch having a first end connected to said ring line and a second end connected to one of a first feed resistor and said surge protection circuit;

a second relay switch having a first end connected to said tip line and a second end connected to one of a second feed resistor and said surge protection circuit;

said first feed resistor having a first end connected to a ring bus for receiving a ring signal and having a second end connected to said first relay switch;

said second feed resistor having a first end connected to a reference potential and having a second end connected to a second relay switch;

a first and second sense resistor respectively connected to said first and second ends of said first feed resistor;

a current differencing circuit which includes:

an amplifier having an inverting port connected to said first sense resistor and having a non-inverting port connected to said reference potential, said amplifier also having an output port for outputting an amplified signal;

a first resistor connected between said output port and said inverting port of said amplifier; and a second resistor connected to said output port of said amplifier, wherein said amplified signal corresponds to a current difference between a first current flowing across said first sense resistor and a second current flowing across said second sense resistor;

a current to voltage converter connected to said current differencing circuit and configured to receive said amplified signal and to output a voltage difference as a result thereof, said voltage difference being representative of said current difference expressed as a voltage; and a power cross circuit connected to said current to voltage converter and configured to receive said voltage difference and to output a power cross condition when said voltage difference is greater than a predetermined voltage value.

9. An apparatus according to claim 8, wherein said first feed resistor has a resistance value equal to about 500 ohms.

10. An apparatus according to claim 8, wherein said first and second sense resistors each have a resistance value equal to about 750 kohms.

11. An apparatus according to claim 10, wherein said current to voltage converter comprises:

a second amplifier having an inverting port, a noninverting port, and an output port, said inverting port receiving said current difference and said noninverting port being connected to a reference potential; and a third and a fourth resistor connected in series between said inverting port and said output port of said third amplifier, said third and fourth resistors each having a substantially equivalent resistance value, wherein said voltage difference at said output port of said second amplifier corresponds to a voltage equal to said current difference multiplied by said third resistor.

12. An apparatus according to claim 11, wherein said power cross circuit comprises:

a third amplifier having an inverting port, a noninverting port, and an output port, said inverting port being connected to a junction point between said third and fourth resistors, and said noninverting port being connected to receive a reference current; and a reference resistor having a first end connected to said noninverting input of said third amplifier and having a second end connected to said output of said third amplifier, wherein said power cross circuit outputs a power cross indication on said output port of said third amplifier when said current difference multiplied by said substantially equivalent resistance value of said third and fourth resistors is greater than said reference current multiplied by a resistance of said reference resistor.

13. An apparatus according to claim 12, wherein said first and second relay switches are connected to said surge protection circuit when said power cross circuit outputs said power cross indication, and said first and second relay switches are respectively connected to said first and second feed resistors otherwise.

* * * * *